(12) United States Patent
Hund et al.

(10) Patent No.: US 6,797,785 B1
(45) Date of Patent: Sep. 28, 2004

(54) METHODS FOR SYNTHESIZING POLYVINYL AMINE (PVA) TYPE FLOCCULATING AND COAGULATING AGENTS, NOVEL AGENTS THUS OBTAINED, USES THEREOF AND IMPROVED PAPER TYPES THUS OBTAINED

(75) Inventors: René Hund, Villars (FR); Christian Jehn-Rendu, Saint-Etienne Cedex (FR)

(73) Assignee: SNF S.A., Saint-Etienne (FR)

( * ) Notice: Subject to any disclaimer, the term of this patent is extended or adjusted under 35 U.S.C. 154(b) by 0 days.

(21) Appl. No.: 09/926,245

(22) PCT Filed: Mar. 9, 2000

(86) PCT No.: PCT/FR00/00604

§ 371 (c)(1),
(2), (4) Date: Dec. 31, 2001

(87) PCT Pub. No.: WO00/58378

PCT Pub. Date: Oct. 5, 2000

(30) Foreign Application Priority Data

Mar. 29, 1999 (FR) .............................. 99 03928

(51) Int. Cl.⁷ .................................. C08F 8/12
(52) U.S. Cl. .................. 525/328.2; 525/340; 525/369
(58) Field of Search .............................. 525/328.2, 340, 525/369

(56) References Cited

U.S. PATENT DOCUMENTS

| | | | |
|---|---|---|---|
| 4,421,602 A | | 12/1983 | Brunnmueller et al. |
| 4,739,008 A | | 4/1988 | Robinson et al. |
| 5,280,077 A | * | 1/1994 | Carroll et al. ............ 525/328.2 |
| 5,290,880 A | | 3/1994 | Moench et al. |
| 5,739,190 A | | 4/1998 | Hartmann et al. |
| 6,121,409 A | * | 9/2000 | Mitchell et al. ............ 528/328 |

FOREIGN PATENT DOCUMENTS

| | | |
|---|---|---|
| DE | 44 09 903 A1 | 9/1991 |
| DE | 40 07 310 A1 | 9/1995 |
| DE | 197 10 212 A1 | 9/1998 |
| EP | 0 295 614 A1 | 12/1988 |

* cited by examiner

Primary Examiner—Bernard Lipman
(74) Attorney, Agent, or Firm—Arent Fox, PLLC

(57) ABSTRACT

The invention relates to a process of synthesis at low temperature of polymers of the PVA (polyvinylamine) type on the basis the monomer vinylformamide. The polymerization claimed for the invention begins at around 0° C., is initiated by an original combination of redox and azoic catalysts, and is conducted under more or less normal pressure. The polymerization is conducted in water and is followed by direct hydrolysis. A powdered cationic PVA of high molecular weight is thereby obtained. The process may also be conducted in an emulsion at an initiation temperature of around 15° C. Application of PVAs as flocculants and coagulants in the paper, water treatment, petroleum and parapetroleum, and, similar industries.

48 Claims, 2 Drawing Sheets

METHODS FOR SYNTHESIZING POLYVINYL AMINE (PVA) TYPE FLOCCULATING AND COAGULATING AGENTS, NOVEL AGENTS THUS OBTAINED, USES THEREOF AND IMPROVED PAPER TYPES THUS OBTAINED

This invention relates to the technical sector of synthetic agents characterized by flocculating and/or coagulating action.

The invention relates specifically to the technical sector of synthesis and applications of polyvinylamines (PVA).

In particular, the invention relates to applications of such PVAs in manufacture of paper and especially for production of paper or cardboard sheets exhibiting an array of interesting properties.

The invention also relates to application of PVAs in the water treatment industry and to the area of petroleum and parapetroleum activities.

The invention also relates to all known applications of flocculants and coagulants.

GENERAL PRIOR ART

During manufacture of paper, cardboard, or the like, or in preparation of fluids for petroleum or parapetroleum use, or in treatment of waste water, specifically "municipal" waste water containing urban waste, use of flocculant and/or coagulant agents is well known, especially retention agents of the polymer type whose function it is to retain a maximum of fines and charges in a sheet of paper, or again flocculation/coagulation agents whose function it will be to flocculate waste suspended in waste water, etc.

In the area of paper the beneficial effects resulting from a retention agent are essentially:
  increase in production and lowering of manufacturing costs: energy savings, smoother running of the machine, higher yield of fibers, fines, charges, and anionic upgrading products, lower acidity in the circuit combined with decreased use of aluminum sulfate and accordingly fewer corrosion problems;
  improvement in quality: better formation and better look-through; improvement in moisture content of the sheet, opacity, breaker stack, absorptivity, and decrease in the porosity of paper.

Polymers were introduced as flocculants about forty years ago, with the molecular weights which were relatively low at the time. U.S. Pat. No. 3,235,490 (Goren) describes various gel polymers.

Certain Goren polymers have been used as coagulants, especially for the purpose of coagulating very fine solids in suspension.

The addition of bentonite to the paste was proposed long ago; it may be added to other mineral products such aluminum sulfates, even synthetic polymers, in particular polyethylene imine (see, for example, documents DE-A-2 262 90s and U.S. Pat. No. 2,368,635).

Document U.S. Pat. No. 3,052,595 proposed combination of bentonite with a polyacrylamide with an essentially linear characteristic. This process was found to compete with systems easier to apply while being characterized by performance just as high. In addition, even with the current linear polyacrylamides, the retaining power is still insufficient.

Document EP-A-0 017 353 proposes combination of a non-ionic to slightly anionic copolyacrylamide with bentonite for retention of low-charge pastes (maximum of 5% of charges). This process makes hardly any progress, since these polymers are relatively low-performing with respect to retention, in particular charged pastes, undoubtedly as a result of insufficient synergy between these polymers and bentonite, which has little tendency to recoagulate.

Document EP-A-0 235 893 proposes resort to cationic polyacrylamides of molecular weight higher than one million, thirty million or more, essentially linear polyacrylamides. In this way a retention effect is obtained which is certainly satisfactory but still deemed insufficient in application to paper, since bentonite entails difficulties during subsequent treatment of effluents at the machine outlet, and users select this system only if there are significant advantages.

In notes presented in connection with a course in Seattle, 11–13 October 1989, and published with the title "Supercoagulation in the control of wet end chemistry by synthetic polymer and activated bentonite," R. Kajasvirta described the mechanism of supercoagulation of activated bentonite in the presence of a cationic copolyacrylamide, without specifying the exact nature of the mechanism. This process entails the same disadvantages as the one referred to in the preceding paragraph.

Lastly, EP 0 574 335 has disclosed an important improvement, use of branched polymers (polyacrylamides in particular) in powder form.

Also known in the prior art are systems of retention agents for manufacture of a sheet of paper, cardboard, or the like which consist of a combination of two retention agents, generally a primary retention agent and a secondary retention agent. What is involved in this instance is a system qualified as "dual."

Patent U.S. Pat. No. 4,753,710 thus advocates use of a linear acrylic polymer of high molecular weight as primary retention agent which is added to the fibrous mass, then shearing, particularly in the mixing pump or "fan pump," and then addition of bentonite (which is a swelling clay) as secondary retention agent.

In the area of waste water treatment there are, for example, patents EP 0 202 780 or EP 0 201 237, the teachings of which overlap. In this industry effort is applied to achieve clearness of water, an imperative for customer satisfaction, but also the greatest degree of dryness possible of the residue obtained and separated, since gain even of a minimal degree of dry content represents enormous savings in transportation of residues because of the smaller amount of water which has to be hauled.

Also of the state of the art among other polymers is polyethyleneimine or PEI, which is one of the oldest synthetic cationic flocculants. PEI is often used to treat industrial or municipal waste, but above all as draining and retention agent in the paper industry (the reference being to "polymin SK"™).

Use of PVA or polyvinylamine, especially in the sphere of paper, has also been proposed in the prior art. PVA is known to form a structure of flakes both very solid and of small dimension, one including little bound moisture.

Patent BASF DE 44 09 903 describes a process of PVA synthesis which is applied at around 40° C. and which yields a gel which is then dispersed in methanol. The polymerization system employs a pure azoic catalyst; no redox system is in operation in accordance with the technique described. In addition, the process is very slow and highly complex.

The patent Mitsubishi JP 07 118 333 discloses polymerization by precipitation based on solution in a solvent of the methanol type. The process is slow and complex because of the constraints associated with use and recirculation of a solvent.

Patent Mitsubishi GB 2 308 123 discloses a complex process of precipitation by PEG (polyethylene glycol) and hydrolysis of the solution obtained on the basis of the resulting product.

These two patents utilize pure azoics.

Also known is the patent Mitsui JP 0 628 7232, which also discloses use of an azoic catalyst.

Patent BETZ Canada 2110366 uniquely describes polymerization in solution with a pure azoic system and an application as coagulant.

Other documents (among others, GRACE) describe a bentonite paper application combined with a PVA and a polyacrylamide.

Patent BETZ U.S. Pat. No. 5,292,441 describes a process of PVA quaternization.

The patent BASF U.S. Pat. No. 5,290,880 describes a PVA synthesis which utilizes initiation of polymerization at 25–80° C. by a complex redox system combined with an azoic catalyst, with heavy mechanical constraints such as mixture constraints with prepolymerization. All the examples include initiation which is conducted only with a pure azoic, at a temperature of the order of 60° C. According to this document polymerization is carried out at a temperature which may reach 150° C.

This patent is to be compared to patent U.S. Pat. No. 4,808,683, which claims polymerization at temperatures ranging from 30 to 100° C., with examples around 60°, or again patent U.S. Pat. No. 4,421,602, which specifies polymerization by means of a complex redox initiator system combined with an azoic, with polymerization temperatures of 30 to 140° C., with examples at 40, 50, and 60° C.

There is also patent EP 0 220 603, which describes conduct of PVA synthesis in supercritical CO2.

As is to be seen, many industrial groups have made many attempts at using PVA, but use of PVA has until now been in conflict with the obligation of resorting to complex synthesis processes involving numerous stages and numerous intermediate products utilizing effects of pressure, temperature, vacuum, or mixing operations, presence of solvents, etc, and so expensive processes resulting in complex engineering entailing costly and difficult application also creating problems with respect to the environment such as created by use of solvents.

Hence the PVAs obtained require industrial application which is either difficult or costly or complex, or entails both disadvantages simultaneously.

Now PVA continues to be a very interesting product because of its high capacity for coagulation and even flocculation.

SUMMARY OF THE INVENTION

There has long been a clearly identified need of large industrial groups, but one not satisfied, for availability of a PVA which is easy to produce, as directly as possible by industrial means, by a simple process, while complying with current environmental impact standards, at low cost, one easy to be used in the industries in question. A simple process conducted at atmospheric pressure and at a low temperature would be especially highly appreciated, for obvious reasons.

An attempt has always been made to work at a low temperature, without success, for reasons other than economic, especially because of the low reactivity of the monomer NVF (N-vinylformamide), and also because the expert knows that, if polymerization is initiated and conducted at a low temperature, the molecular weight of the PVA obtained will be higher, because of better control of polymerization, which is a recognized need in these industries.

It is of course essential that these improvements not be made to the detriment of the properties of the agent and contemplated flocculation and/or coagulation applications, the complexity and often antagonistic character of which, well known to the expert, were referred to earlier.

Hence one object of the invention is to develop such a process which is simple, direct, inexpensive, and which leads directly to a PPVA product usable in a simple and direct application process despite the known low and discouraging reactivity of NVF.

It is claimed for this invention that use is made of a PVA (polyvinylamine) type polymer obtained by a special synthesis process as coagulation/flocculation agent designed to effect clear-cut improvement in the retention, formation, draining, and other properties of a sheet of paper or cardboard thereby obtained, or the flocculation/coagulation of streams of industrial or municipal effluents, and waste water in general.

The PVA may be obtained either as a unique agent or one mixed with other known flocculation/coagulation agents.

The invention relates to a process of synthesis at low temperature and under normal or atmospheric pressure of polymers such as PVA (polyvinylamine), in powder form or in emulsion, on the basis of the monomer N-vinylformamide.

The word "polymers" is used here and throughout the patent application to designate both homopolymers and copolymers with monomers copolymerizable with N-vinylformamide, nonrestrictive examples of which being acrylamide or substituted derivatives of acrylamide, (meth) acrylic acid, the (meth) acrylates, the esters of (meth) acrylates, the monomers known by the abbreviations APTAC, MAPTAC, AMPS, n-vinylacetate, acrylonitrile, and DADMAC.

Note: APTAC=acrylamidopropyltrimethyl ammonium (chloride) MAPTAC=meth(APTAC) DADMAC= diallyldimethylammonium (chloride)

As a first option, the polymerization claimed for the invention is a polymerization in bulk, in an aqueous medium or in water, at a temperature which may be as low as –2° C. or 0° C. or 2° C., maximum +5° C. to 10° C., is initiated by an original combination of redox and azoic catalyst(s), then continues at a temperature below 100° C., and is conducted under more or less normal or even, preferably, atmospheric pressure.

Polymerization is conducted in water and results in a non-ionic PVA polymer gel.

It is followed by direct hydrolysis with the gel obtained at the end of polymerization in order to obtain a cationic PVA polymer which is subjected to a standard drying stage, for example, in a fluidized bed or in a rotary oven.

In this way there is obtained directly a dry cationic PVA in powdered form, of high molecular weight, directly applicable in industry, a PVA which allows highly interesting applications in the industries referred to.

The powder may be used as such or may be dissolved in an aqueous medium such as water, and the agent claimed for the invention may be used alone or in combination with other powders and/or other solutions of known flocculant agents and/or coagulants, in a compatible physical form.

In the prior art mentioned above polymerizations were always carried out at a temperature very substantially higher than 0° C. and even substantially higher than ambient temperature, such as 50, 60, 70° C., or even 100° C. Most often the polymerization was also carried out under pressure. Even patent BASF U.S. Pat. No. 5,290,880, which in the opinion of the applicant represents the proximate state of the art, in the sense that it describes a combination of azoic and redox initiator, but citing only a pure azoic, azobisamidopropane dichlorohydrate, in his ten examples (something which separates the expert from the redox/azoic solution), is forced to initiate polymerization between 25 and 80° C., in particular around 60° C. in the examples, and to conduct the polymerization at a high temperature, of the order of 150° C.

Moreover, in the prior art cited, one succeeds in obtaining only PVAs in liquid or emulsion form or in the form of a product reprecipitated or dried by drying by pulverization or "spray-drying," something which entailed the well-known disadvantages such as the necessity of transporting large amounts of water and solvent, the necessity of reversing the emulsion at the location at which it was used, and the like. At best it was possible to precipitate an acetone powder on the basis of PVA in emulsion, but this represents an additional step, and so significant added industrial cost, a step which entails use of acetone, a dangerous solvent which must be recycled, again at significant added cost.

According to the invention, in contrast, a directly usable dry powder is obtained immediately, a powder of great interest to the industries in question.

As a second option, which will be described below, the polymerization may also be conducted in an emulsion while being initiated at a low temperature of the order of 15 to 20–25° C.

It is claimed for the invention that use may also be made to advantage of the "dry powder" which may be obtained by drying the emulsion in question, in particular by drying by pulverization ("spray-drying") or by densification drying. A "dry powder" such as this presents advantages in terms of molecular weight and flocculation capacity.

DETAILED DESCRIPTION OF INVENTION

Figure 1:
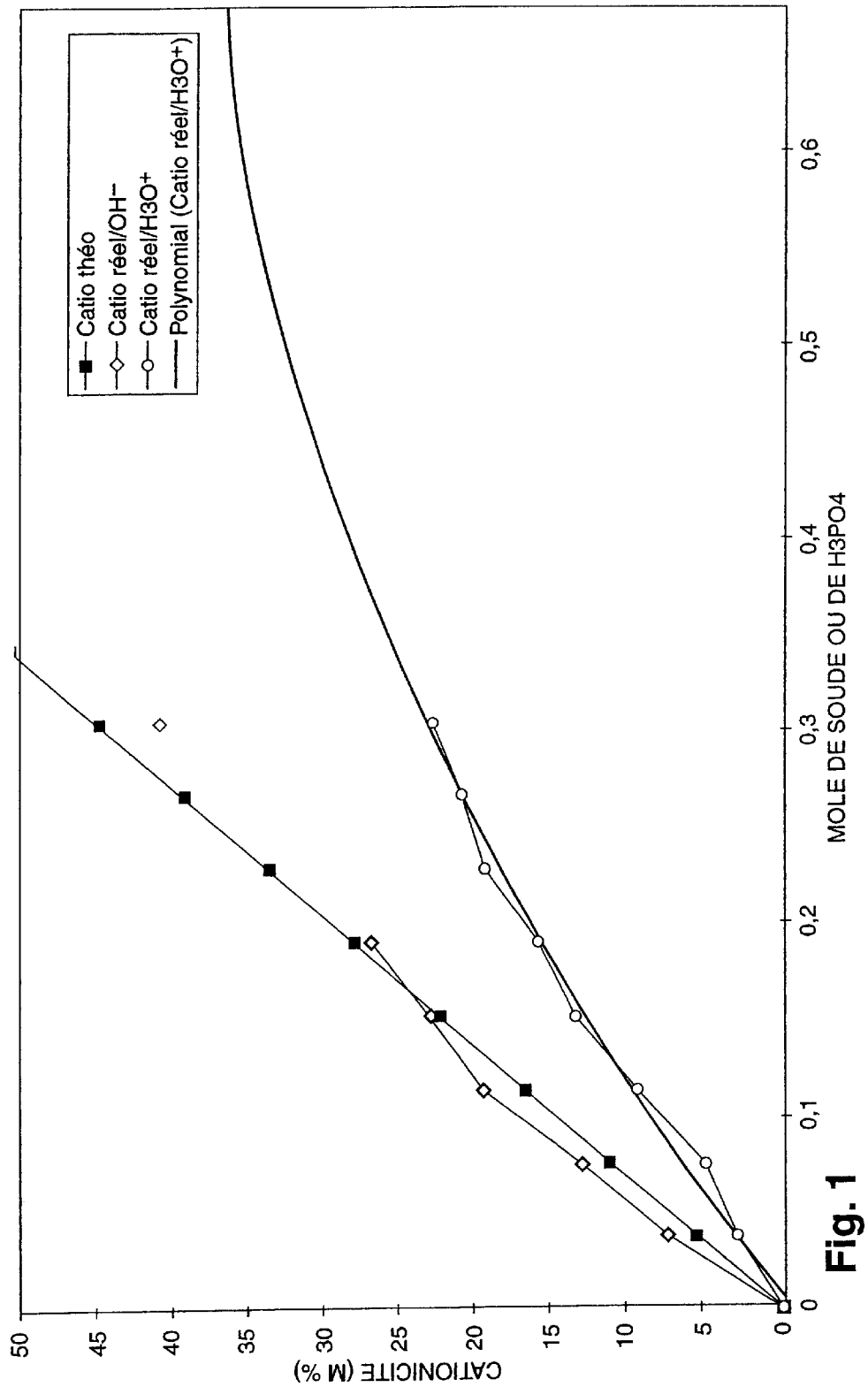
FIG. 1 shows a comparison of acid and alkali hydrolysis.

In the better embodiment the redox system used for polymerization is made up of a combination of tertiobutyl hydroperoxide or TBHP and sodium metabisulfite.

The following are other less preferably usable redox systems: oxidants: hydroperoxides such as cumene hydroperoxide, oxygenated water, or persulfates, etc, which are well known; reduction agents: NaFS or formaldehyde-sodium sulfoxylate, salts of sulfites and bisulfites, SO2, etc, which are well known;

In the better embodiment the azoic initiator used is AZDN (azobisisobutyronitrile)

Other less preferable azoic catalysts are the products identified in Table A presented below.

By preference use will be made of the following initiator system:
  combination of tertiobutyl hydroperoxide or TBHP and sodium metabisulfite in a ratio of 1:0.5 to 1:3, preferably in a ratio of 1:2 to 1:1.

In the first, "powder," embodiment of the invention, the process of synthesis consists of:
  (a) polymerization of the vinylformamide monomer in bulk, in water or an aqueous medium, at a very low temperature, that is, at a polymerization initiation temperature near 0° C. and at a polymerization completion temperature which remains below 100–105° C., preferably below or equal to 100° C., under more or less normal pressure, especially atmospheric pressure, in the presence of a polymerization initiator comprising at least one combination of redox system and initiator of the azoic type.
  (b) thereby obtaining a non-ionic polymer gel PVA (isolation of which is not necessarily mandatory)
  (c) grinding the gel thus obtained by known mechanical means such as an endless screws or, in the laboratory, a household chopper of the Moulinex™ type or the like.
  (d) hydrolyzing the gel obtained.

The polymerization initiation temperature is of the order of −2° C., 0° C. or +2° C., and optionally may be higher, but in any event not exceeding 5° C.–10° C., the advantages of the invention being lost beyond this temperature, especially achievement of high molecular weights.

The polymerization offers the great advantage of being carried out without a solvent.

The words "more or less under normal pressure" are used to note the fact that the process is not deliberately conducted under pressure. Use is typically to be made of atmospheric pressure.

By preference the hydrolysis is to be carried out with pulverized gel, in a continuous or semi-continuous process which represents one of the advantages of the invention.

Hydrolysis is conducted with the gel, which contains about 30 to 60% water, preferably around 50% water.

The hydrolysis is effected in an acid or basic medium OH(−) or H(+), especially with the soda NaOH or phosphoric acid $H_3PO_4$ used as hydrolysis agent.

Hydrolysis is carried out with the gel at the end of polymerization (gel temperature around 90–95° C.); this eliminates the need for adding a specific supplementary heating step in order to accomplish hydrolysis.

Grains of partly hydrolyzed cationic PVA performing amine functions are obtained.

It is claimed for the invention that the degree of hydrolysis ranges from 20 to 70%, by preference 45 to 60%, preferably around 50% of amine functions. This will depend on the application contemplated.

In the second, "emulsion," embodiment of the invention, the process of synthesis consists of:
  (i) preparing an aqueous phase comprising the monomer N-vinylformamide (NVFA), water, and suitable additives such as sodium acetate and including at least one azoic initiator such as the well-known VAO44 (cf Table A), as well as at least one oxidant such as TBHP.
  (ii) preparing an organic phase including a light oil and/or a heavy one such as EXXSOL D 100™ and a mixture of surfactants such as those of the SPAN 80™ type with HLB (hydrophilic-lipophilic balance) of 4.3 and HYPERMER 1083™ with HLB of 5.5.

The polymerization initiation temperature is an ambient temperature, and so of the order of 15 to 25° C.; the redox couple reduction agent, such as sodium metabisulfite, is added continuously.

The expert may, of course, use state-of-the art surfactants, and mixtures of them, in accordance with the customary criteria and after reading this application.

The HLB of the mixture will be adjusted to a typical but non-restrictive value between 4 and 5.
  (iii) preparing an inverse emulsion by a state-of-the-art method by means of two stages, which are freed of gas;
    (a) initiation of emulsion polymerization at a low temperature, that is, a temperature near the ambient, between 15 and 25° C., and at a polymerization temperature which remains below 50–60° C., if necessary while absorbing the exothermal yield with water, at more or less normal pressure, in the presence of a polymerization initiator including at least one combination of redox system and initiator of the azoic type;

(b) thereby obtaining a non-ionic polymer PVA emulsion (isolation of which is not mandatory);

(c) hydrolysis of the emulsion obtained.

The words "under more or less normal pressure" denote the fact that the reaction pressure is allowed to be established.

Hydrolysis with the emulsion obtained in polymerization is preferably conducted in a continuous process which represents one of the advantages of the invention.

The hydrolysis is carried out in an OH(−) or H(+) medium, as for example by phosphoric acid at 75%.

The heat of reaction is utilized for the hydrolysis; this eliminates the need for heating the hydrolysis environment, the temperature at the end of polymerization (around 50–60° C.) being sufficient for hydrolysis, or again slight overheating (to around 80° C.) may be carried out in order to speed up the rate of hydrolysis.

A partly hydrolyzed cationic PVA emulsion acting as an amine is obtained.

It is claimed for the invention that the degree of hydrolysis ranges from 20 to 70%, preferably around 40% of amine functions.

The hydrolyzed emulsion then receives, while being agitated, around 1 to 5% by weight NP9 inverter, which serves to render the emulsion water soluble and is well known to the expert.

The invention relates to the general process of synthesis of the polyvinylamine (PVA) polymer, in that it comprises initiation of polymerization of N-vinylformamide at low temperature, of the order of −2 to +2 or 5–10° C. for the powder option, or 15–25° C. for the emulsion option, by means of an initiating combination of redox system and azoic catalyst(s).

The invention relates specifically to the processes which have just been described and to their embodiments and alternatives.

The invention also relates to the polymer polyvinylamine (PVA) obtained as a gel or as an emulsion by these processes.

The invention also relates to the hydrolyzed or partly hydrolyzed polymer polyvinylamide obtained by hydrolysis of such gel or emulsion obtained by these processes, in the form of grains or dry powder respectively, or in that of a reverse emulsion revertible to water.

Hence a PVA powder may be obtained in accordance with the invention, which powder may be combined with another (or several other) high-weight molecular agent(s).

As an alternative the solutions or corresponding dispersions obtained on the basis of the powders may be combined.

It is claimed for the invention that a PVA emulsion may also be obtained which may be combined with another emulsion of another (or several other) high-weight molecular agent(s).

The invention also relates to such reversed emulsion with hydrolyzed or partly hydrolyzed polyvinylamine PVA polymer obtained in emulsion by the process described above.

The invention also relates to such water-reversed emulsion of hydrolyzed or partly hydrolyzed polyvinylamine PVA polymer obtained as an emulsion or as a "dry powder" by the procedure described above combined with one or more solutions of flocculant/coagulant agents of high molecular weight.

The invention also relates to the gel or intermediate emulsion obtained at the end of polymerization as claimed for the invention, that is, before hydrolysis, and their synthesis. Such intermediate products are useful in industry, the emulsions in particular.

The invention also relates to compositions for all industrial uses, especially as flocculant or coagulant agents, characterized in that such compositions comprise at least one PVA obtained in any of the forms described as obtained by one of the processes described above, including in powder form, a solution of such powder in water or an aqueous medium, reverse emulsion, or reversible emulsion reversed with water.

The invention also relates to compositions for paper use, in particular as flocculant or coagulant agents and charge retention agents, characterized in that such compositions comprise at least one PVA in one of the forms as described above, including in powder form, as a solution of such powder in water or an aqueous medium, reverse emulsion or reversible emulsion reversed with water.

The invention also relates to compositions for waste water treatment, in particular as flocculation and/or coagulation agents, characterized in that such compositions comprise at least one PVA obtained in one of the forms described by one of the processes described above, including in the form of a powder, solution of such powder in water or an aqueous medium), a reverse emulsion or reversible emulsion reversed with water.

The invention also relates to compositions for petroleum and parapetroleum applications, characterized in that such compositions comprise at least one PVA obtained in one of the forms described by one of the processes described above, including in the form of a powder, a solution of such powder in water or an aqueous medium, a reverse emulsion or reversible emulsion reversed with water.

The invention also relates to the above compositions in which at least one PVA prepared in accordance with the invention is combined or associated with at least one other flocculant and/or coagulant agent of high molecular weight, and optionally with other known additives.

Figure 2:
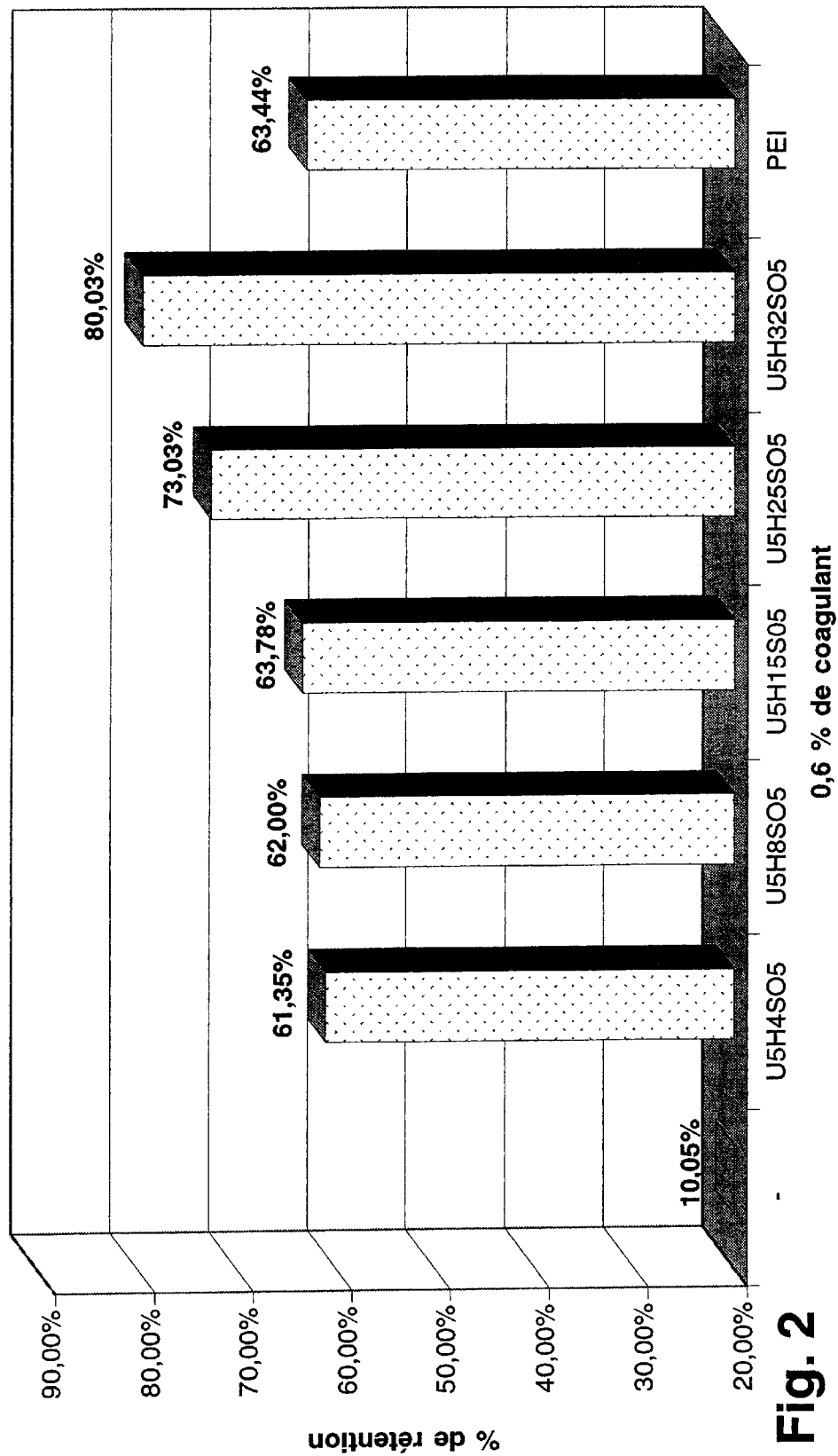
FIG. 2 corresponds to Table C.

Other characteristics and advantages of the invention will be more clearly brought forth by reading of the following description and reference to the attached drawing, in which FIG. 1 shows the variation of powdered PVA basicity with the number of moles of NaOH or H3PO4 used for hydrolysis;

FIG. 2 shows the correlation of (powdered) PVA basicity with the degree of charge retention.

The following examples illustrate the invention, but do not restrict its range.

EXAMPLE OF FORMULATION

Pn-Vinyl-formamide Powder

I. Various Polymers (a) 1500 g charge:
NVFA monomer N-vinylformamide (VINAMER™)= 660 g=660 g pure
$H_2O$: 840 g
Socium acetate (salt): 0.1% (with respect to charge): 1.5 g
$H_3PO_4$ 40%: amount necessary to obtain pH of 6.00

(b) Catalysis

| TEST No 1 | TEST No 2 | TEST No 3 | |
|---|---|---|---|
| 100 | 100 | 75 | ppm VA 0 44/charge |
| 0 | 0 | 0 | ppm V 50/charge |
| 1000 | 1000 | 1000 | ppm AZDN/charge |
| 200 | 150 | 100 | ppm TBHP/charge |
| 250 | 150 | 75 | ppm MBS/charge |
| 1h25 | 1h40 | 2h00 | kinetics |

(c) initial temperature 0° C.
    final temperature: 100–102° C. pH=5–6

Hydrolysis of Gel (a) The gel is ground into coarse particles (amount 100 g)

(b) During the grinding stage, introduction of a 50% soda fraction corresponding to 0.076 mol.

(c) The reaction generates little heat.

(d) The gel is placed in a polypropylene bag, which is then sealed.

(e) The entire unit is placed in an oven at a constant temperature of 80° C. for one hour.

(f) At the end of one hour the gel is reground, then 0.076 mol of soda is added. This sequence is followed by holding in the bag and in the oven for one hour.

(g) This operation is repeated until the number of mol of soda (or hydrolysis agent) added corresponds to the amount of hydrolysis sought by limiting the number of hydrolysis agent fractions to 4. See FIG. 1.

(i) A gel is then obtained which may be dried conventionally on a fluid-bed dryer.

(j) The hydrolysis stages may also be conducted in an acid environment with conventional acids such as HCl, $H_3PO_4$, $HNO_3$.

III. Comparison of Acid Hydrolysis with Alkaline Hydrolysis

FIG. 1 shows the variations in basicity observed as a function of the number of mol of soda or phosphoric acid added per 0.634 mol of polyvinylformamide.

The graph demonstrates that alkaline hydrolysis exhibits more of a stoichimetric profile than does acid hydrolysis.

IV. Characteristics of Final Product

Soluble products are obtained which are of high molecular weight and of basicity ranging from 0 to 50 mol or theoretically even 100 mol; the UL viscosities of the products are the following:

| TEST No 1 | TEST No 2 | TEST No 3 |
|---|---|---|
| 2.2 cPs | 2.6 cPs | 3.1 cPs |

(measurement of viscosity per g active polymer/liter in a 1-mol NaCl solution, at 25° C., 60 60 rpm, UL adaptor)

Example of Polymerization in N-Vinylformamide Emulsion
I. Synthesis of NVFA (N-Vinylformamide Emulsion) Phase Relation 71/29

| TEST No 4 | TEST No 5 | TEST No 6 | |
|---|---|---|---|
| (a) Aqueous phase: | | | |
| 250 | | | G NVFA (BASF) |
| 50 | 25 | 25 | ppm TBHP/aqueous phase |
| 166 | 100 | 75 | ppm VA 044/aggregate charge |
| 0 | 0 | 25 | ppm V 50/aggregate charge |
| 460 | 460 | 460 | g water |
| 0.01 | 0.01 | 0.01 | % sodium acetate/total aqueous phase | pH=6

(b) Organic phase:
    260 g Exxsol D100
    2% HLB Span 80: 4.3
    1% HLB Hypermer 1083: 5.5

(c) The aggregate amount of azoic initiator(s) indicated and the amount of TBHP indicated are introduced in the aqueous phase.

(c') The two phases are emulsified.

(d) The emulsion is degassed for 30 minutes and started up at an ambient temperature of the order of 15 to 20° C. At the end of degassing the metabisulfite reduction component of the redox couple is introduced continuously for this purpose, in a solution diluted with 1 g/l.

(e) Once initiation has been effected, release of heat is controlled by absorption of the calories by water.

(f) The final temperature is near 54° C. and the reaction time is 3 h to 4 h 30 minutes.

(g) The final product is then incorporated with a reversing agent of the NP9 type at the rate of 2.2%.

UL Viscosities

| TEST No. 4 | TEST No. 5 | TEST No. 6 |
|---|---|---|
| 3.6 cPs | 3.9 cPs | 4.1 cPs |

(measurement of viscosity with 1 g active polymer per liter in a 1-mol NaCl solution, 25° C., 60 rpm, UL adaptor)

II. Hydrolysis of NVFA Emulsion:

Starting with step (f), amounts of 75% phosphoric acid varying from 0.023 mol to 0.092 mol are added to the emulsion.

The following basicity values were obtained:

| Number of mol $H_3PO_4$ | Basicity obtained, mol % |
|---|---|
| 0.023 | 5 |
| 0.046 | 12 |
| 0.069 | 19 |
| 0.092 | 17 |

Assignment of a maximum value to the basicity obtained in an acid medium.
Hydrolysis conditions:
    80° C. over 4 hours in reflux.

III. Incorporation of Hydrolyzed Emulsion:
  2.2% NP9 added during agitation.

Example of VF (Vinylformamide)/DADMAC and VF/Acrylamide Copolymerization

|  |  | 1500 g charge | |
|---|---|---|---|
|  |  | TEST 7 | TEST 8 |
| (a) | NVF | 645.8 g | 450 |
|  | Acrylamide (50) | 0 | 100 |
|  | DADMAC (62) | 125.0 g | 0 |
|  | WATER | 727.5 g | 948.5 |
|  | $H_3PO_4$ | for adjustment to pHi | |
|  | Nq acetate | 1.5 g | |
| (b) | Catalysis | | |
|  | VA044 ppm/charge | 100 | 50 |
|  | V50 ppm/charge | 0 | 0 |
|  | AZDN ppm/charge | 1000 | 1000 |
|  | TBHP ppm/charge | 100 | 100 |
|  | MBS ppm/charge | 100 | 100 |
|  | Kinetics | 2h00 | 1h20 |
| (c) | Operating conditions | | |
|  | Initial temperature 0° C. | | |
|  | Final temperature 100° C. | | |
|  | PH 5–6 | | |
| (d) | UL Viscosities (cPs) | 2.5 | 3.4 |

Examples of Performance of Powdered Polyvinylamines in Paper Applications

The object is to compare the PVAs obtained as claimed for the invention with the PEI (polyethylene imine) product "Polymin SK"™, which is widely used by the expert.

Reference is to be made to Table B below, which relates to Test No. 2 specified above, with a hydrolysis rate of 27%.

Test 14 is to be compared with test 15, and test 28 with test 29, respectively, in another proportion.

Better retention of charges and of FPR, in low and high proportions, representing an improvement of 20% relative to PEI, is achieved.

In a low proportion PVA is far superior to PEI in terms of 30' turbidities in the first and third passes; this indicates better coagulation of the colloidal elements, and better clarity of the water under cloth is also observed.

An advantage in all proportions of PVA relative to PEI is also observed in terms of total retention.

Reference is then to be made to Table C, which corresponds to test No. 1 above, with a variable hydrolysis rate of 4, 8, 15, 25, and 32%.

FIG. 2 corresponds to Table C: for the PVF (polyvinylformamide) at different percentages of hydrolysis the retention increases more or less in proportion to PVA hydrolysis rates. An improvement over PEI of the order of 30% is to be observed at 32% hydrolysis.

Table C indicates that the clarity of the water under cloth is better with PVA than with PEI, in first, second, or third pass turbidity, and the retention values are far better with PVA.

The lowest molecular weight of three tests was tested. The results would be even better with higher molecular weights.

The products claimed for the invention are superior in charge suspension to the "Polymin SK"™ PEI, which is one of the references of the expert on this subject.

The Abbreviations Have the Following Meanings:
  KF kraft sheet paste
  KR kraft resin paste
  PM mechanical paste
  GCC ground CaCO3 (ground calcium carbonate)
  CSF Canadian Standard Freeness (dripping test)
  A.Rét retention agent
  Cha MP Mineral charge
  Tur. Turbidity
  MES suspended matter
  Pds weight of sheet on first pass
  Feuille weight of sheet
  X on first pass
  R2 on second recirculation of monobasic lead acetate on third pass
  Ash (cendres)

Example of Powdered Polyvinylamine Performance in Paste Water Treatment Applications

ADDITION OF A PVA TO IMPROVE PERFORMANCE OF A FLOCCULANT

Object:
  The object is to improve a flocculant by addition of a PVA to standard flocculant FO4698, on dehydration of sludge (filtration, centrifuging).

Nature of Effluent:
  Mixed sludge densifier discharge from STEP (municipal sewerage plant) at Saint-Etienne (France).
  MS: 42.6 g/l
  initial pH=6.5

Results:
  Volume of sample treated: 200 ml Method: test dripping on Buchner funnel+dry content at 5 bar.
  The operations and results are summarized in Table D below. Notes to Table D:

TABLE D

| PVA | PVA/PAA ppm mixture ratio, ppm | Polymer (**) | Total flocculant determined, ppm | (n) | Filtrate volume (ml) | | | | | Dry content % | Clarity NTU |
|---|---|---|---|---|---|---|---|---|---|---|---|
|  |  |  |  |  | 5" | 10" | 15" | 30" | 1' |  |  |
| Test No. 1 hydrolysed at 32% | 1/99 | FO 4698 | 202 | 20 | 38 | 48 | 48 | 72 | 63 | 18.9 | 101 |
| Same | 5/95 | FO 4698 | 210 | 20 | 40 | 48 | 58 | 72 | 90 | 21.6 | 82 |
| Same | 7.5/92.5 | FO 4698 | 215 | 20 | 40 | 46 | 60 | 74 | 78 | 21.4 | 74 |
| Same | 10/90 | FO 4698 | 220 | 20 | 40 | 48 | 58 | 74 | 86 | 18.8 | 74 |

TABLE D-continued

| PVA | PVA/PAA ppm mixture ratio, ppm | Polymer (**) PAA | Total flocculant determined, ppm | (n) | Filtrate volume (ml) | | | | | Dry content % | Clarity NTU |
|---|---|---|---|---|---|---|---|---|---|---|---|
| | | | | | 5" | 10" | 15" | 30" | 1' | | |
| Test No. 3 hydrolysed at 40% | 1/99 | FO 4698 | 202 | 20 | 40 | 50 | 60 | 76 | 88 | 19.1 | 100 |
| Same | 5/95 | FO 4698 | 210 | 20 | 42 | 52 | 60 | 72 | 88 | 21.2 | 80 |
| Same | 7.5/92.5 | FO 4698 | 215 | 20 | 38 | 48 | 56 | 70 | 90 | 21.5 | 74 |
| Same | 10/90 | FO 4698 | 220 | 20 | 40 | 48 | 54 | 72 | 88 | 20.2 | 72 |
| | 0 | FO 4698 | 202 | 20 | 38 | 48 | 54 | 70 | 88 | 18.3 | 125 |
| | 0 | FO 4698 | 220 | 20 | 40 | 50 | 60 | 72 | 88 | 18.5 | 110 |

Findings

Addition of a PVA does not appear to bring about more rapid draining. On the other hand, the gain in dry content is clear when 5 or 7.5% PVA are added. In addition, the filtrates are of much higher quality starting with smaller amounts of PVA. There is a shift from 125 to 74 NTU, that is, an improvement of the order of 60%.

The last two tests show that increased dosage of flocculant alone does not yield the effect created by PVA.

ADDITION OF A PVA IN ORDER TO IMPROVE THE PERFORMANCE OF A FLOCCULANT

Object:

Improvement of a flocculant by addition of a PVA to standard flocculant 4698, on dehydration (filtration, centrifuging).

Nature of Effluent:

Prolonged aeration sludge densifier discharge of STEP (municipal sewerage plant) of Andrézieux (France)

MS: 24.1 g/l initial pH=6.8

Results:

Volume of sample treated: 200 ml

Method: test dripping on Buchner funnel+dry content at 5 bar.

The operations and results are summarized in Table E below.

NTU=standard turbidity units (n)=number of transfusions

ADDITION OF AN ORGANIC COAGULANT TO IMPROVE THE PERFORMANCE OF A FLOCCULANT

Object:

Testing of a new flocculant family for dehydration (filtration, centrifuging) to increase the final dry content and the clarity of filtrates.

Nature of effluent:

Mixed sludge densifier discharge of Saint-Etienne STEP

MS: 42.6 g/l initial pH=6.5

Results:

Volume of sample treated: 200 ml

Method: test dripping on Buchner funnel+dry content at 5 bar.

The results are summarized in Table F below

TABLE E

| PVA | PVA/PAA ppm mixture ratio, ppm | Polymer (**) PAA | Total flocculant determined, ppm | (n) | Filtrate volume (ml) | | | | | Dry content % | Clarity NTU |
|---|---|---|---|---|---|---|---|---|---|---|---|
| | | | | | 5" | 10" | 15" | 30" | 1' | | |
| Test No. 1 hydrolysed at 40% | 1/99 | FO 4698 | 202 | 11 | 90 | 108 | 116 | 124 | 132 | 13.6 | 86 |
| Same | 5/95 | FO 4698 | 210 | 11 | 92 | 110 | 116 | 126 | 134 | 14.4 | 70 |
| Same | 7.5/92.5 | FO 4698 | 215 | 11 | 90 | 110 | 114 | 124 | 132 | 15.2 | 68 |
| Same | 10/90 | FO 4698 | 220 | 11 | 92 | 112 | 116 | 128 | 134 | 15.6 | 64 |
| Same | 1/99 | FO 4698 | 202 | 11 | 90 | 108 | 114 | 126 | 132 | 13.7 | 88 |
| Same | 5/95 | FO 4698 | 210 | 11 | 92 | 110 | 116 | 126 | 132 | 14.3 | 72 |
| Same | 7.5/92.5 | FO 4698 | 215 | 11 | 90 | 112 | 116 | 124 | 132 | 15.3 | 68 |
| Same | 10/90 | FO 4698 | 220 | 11 | 92 | 110 | 114 | 126 | 134 | 15.5 | 66 |
| | 0 | FO 4698 | 202 | 11 | 90 | 108 | 116 | 126 | 132 | 13.4 | 102 |
| | 0 | FO 4698 | 220 | 11 | 94 | 112 | 116 | 128 | 136 | 13.6 | 90 |
| Test No. 7 hydrolysed at 30% | 7.5/92.5 | FO 4698 | 215 | 11 | 91 | 110 | 116 | 125 | 134 | 15.5 | 61 |

(**)Polyacrylamide of high molecular weight

TABLE F

| Polymer | dosage ppm | (n) | Filtrate Vol. (ml) | | | | | (%) | NTU |
|---|---|---|---|---|---|---|---|---|---|
| | | | 5" | 10" | 15" | 30" | 1' | | |
| PVA emulsion test No. 2 | 220 | 20 | 40 | 50 | 56 | 72 | 88 | 19.5 | 80 |
| PVA powder test No. 3 | 220 | 20 | 38 | 48 | 54 | 70 | 88 | 19.4 | 82 |
| FO 4698 | 220 | 20 | 40 | 50 | 60 | 72 | 88 | 18.5 | 110 |

(n) = number of transfusions.

Findings

These new flocculants do not appear to bring about more rapid draining. On the other hand, the gain in dry content is clear for both PVAs. In addition, the filtrates are of higher quality.

General Findings

Addition of a PVA does not appear to effect faster drainage. On the other and, the gain in dryness is clear when 5 or 7.5% PVA are added. Improvement in transparency and three dryness points are observed in comparison with the flocculant in the same amount. In addition, the filtrates are of much superior quality with the smallest additions of PVA.

The improvement in turbidity is of the order of 30% and two points in dryness. In addition, the definite advantage of the NF/DADDAC copolymer hydrolyzed 30% in terms of turbidity (NTU:61) is to be noted.

The invention also relates to the intermediate emulsion or gel obtained at the end of polymerization as claimed for the invention, that is, before hydrolysis, and their synthesis. Such intermediate products are useful in industry, especially the emulsions, for turning out several different hydrolysis rate products, on the basis of a single polymerization charge.

The invention also relates to paper products, especially sheets, characterized in that they contain or have been treated with a PVA agent or a PVA composition claimed for the invention, petroleum or parapetroleum products and fluids, characterized in that they contain or have been treated with a PVA agent or a PVA composition claimed for the invention, and waste water and industrial effluents, characterized in that they contain or have been treated with a PVA agent or a PVA composition claimed for the invention, as well as azoic and redox initiation systems utilized in accordance with the invention to produce a PVA in powdered or emulsion form at a low temperature, such as described above, and their use for this purpose.

The Listings for Measurements and Tests are Given Below

A. PAPER

PREPARATION OF CHEMICAL AND MECHANICAL PASTE MIXTURE (1) Disintegration Composition and Procedure:

Mixture of CDRA hardwood kraft (70%), CDRA resinous kraft (10%), and mechanical paste of Scandinavian pine (20%).

The following are measured precisely:

22.34 g of hardwood kraft CDRA with 94.0% dryness 3.20 g of resinous kraft with 93.7% dryness 6.52 g mechanical paste of Scandinavian pine with 92.0% dryness.

The pieces of virgin pastes are cut up in the mixing bowl of the Waring blender; exactly 800 ml of normal water are added at a temperature near 20° C.

The mixture is blended for two hours with the blender in the high speed position.

Once the blender has stopped, the consistency of the paste is taken to 1.5% at the end by adding 1200 ml water; it is then ready to be disintegrated in the Mark III D with 20% GCC (cf thickstock procedure).

A paste having a CSF of 365 ml±35 is obtained.

(2) For Long-term use (Maximum 1 Month):

It suffices in this instance to filter on a Buchner funnel in order to be able to increase its consistency and to place it in a refrigerator at 4° C.

FORMETTE [HANDSHEET] PARAMETERS (2) Standard used:

| | |
|---|---|
| T1 = 40 sec | agitation at the speed selected on the motor unit (800 rpm for 40 sec.) |
| T2 = 1 sec | startup of accessory 1 by internal command. |
| T3 = 2.2 sec | stopping of accessory 1. |
| T4 = 10 sec | startup of accessory 2 by internal command. |
| T5 = 2 sec | stopping of accessory 2. |
| T6 = 21.1 sec | startup of accessory 3 by internal command. |
| T7 = 3.3 sec | stopping of accessory 3. |
| T8 = 4 sec | nonproductive time. |
| T9 = 3 sec | cone valve opening time. |
| T10 = 0.1 sec | nonproductive time |
| T11 = 0.6 sec | bubbling through of air above grille. |
| T12 = 2 sec | nonproductive time. |
| T13 = 10 sec | sheet formation time. |
| T14 = 2.8 sec | nonproductive time. |
| T15 = 15 sec | recovery of basic lead acetate solution in tank. |
| T16 = 0.1 sec | stop plus nonproductive time |
| T17 = 60 sec | draining of tank. |

All these times may be modified directly by the internal timer.

SHEET FORMATION

Assign the parameters of the automated storage formette [handsheet] in accordance with the system studied (cf formette [handsheet] parameters). Place an 80-mesh cloth in position.

(1) Prepare 3 plastic size 11 cups and add the weight of the moist paste coming from the thickstock subjected to agitation. This amount will depend directly on the weight in grams with which operation is conducted.

Example: at 80 g/m2 and 1.5% consistency, it being known that the area of the template is 0.028 $m^2$, an amount of moist paste equalling:

moist paste=100*(80*0.28)/1.5 is to be set aside.

(2) Increase to a weight of 560 g with tap water.

(3) Pour the entire amount into the formette [handsheet] tank, then prepare the additives (coagulants, retention agents, etc).

(4) Start the sequence and pour the additives at the different points selected.

(5) Recover the sheet X (first pass) to determine its dry weight and the ash percentage.

(6) Recover the basic acid lead acetate solution in order perform measurements of turbidity and MES and use the solution as diluting liquid in the second cup (560 ml)
(7) In the case of the second sheet (R1) only the turbidity is determined; the sheet is recovered in order to have a permanent indication of the quality of formation, and the lead acetate solution is used as diluting liquid for the third sheet.
(8) The third sheet (R2) produced will be tested with precision as was the first (X).

Recapitulation of the tests involved in determination of retention and drainage:

determination of matter in suspension (cf MES procedure)

determination of ash percentage (cf ash procedure)

determination of dry weight of sheets (cf dryness procedure)

CSF drainage index (Cf CSF procedure).

MES MEASUREMENT

Procedure
(1) Agitate the lead acetate solution under cloth with a spatula.
(2) Take a sample of appoximately 50 ml (marked V) in a graduated cylinder.
(3) weigh a Millipore dry filter of porosity of 0.22 $\mu$m and diameter of 4.25 cm (moisture content known).
(4) Filter the V ml through the millipore system.
(5) Rinse the cylinder containing V ml water, then pour the water onto the filter.
(6) Remove the filter and place it in an oven at 105° C.
(7) 5 minutes later remove the filter and weigh it.

The amount of MES=(dry weight of charged filter—dry weight of filter *0.98)*1000/V (convert to mg/l).

MEASUREMENT OF ASH PERCENTAGE

Procedure
(1) Remove the dry sheets and place them in numbered crucibles, force them in firmly to ensure slow burning.
(2) Note the total weight on a precision scale.
(3) Fill the oven in a rigorously specific order so as to remember the positioning of the samples.
(4) Set the oven temperature at 575° C.±25° C.
(5) Heat five hours.
(6) Allow the samples to cool to a temperature of 400° C., then use pincers to place them in the dryer.
(7) After ambient temperature has been restored, weigh the ashes.

Calculation:

% ash in sample=((mass of ashes))/dry weight of sheet)) *100.

B. WATER TREATMENT

RECORD OF USE OF FILTRATION CELL UNDER PRESSURE FOR DETERMINATION OF DRYNESS

Equipment
  400-ml cups
  Ø90 mm Buchner filter
  filter paper in strips×2
  graduated 250-ml test tube
  chronometer
  Filtration cell equipped with inflatable cushion
  Foot pump
  1000-ml cup
  master pattern
  infrared scale
  aluminum test crucibles (1) Drainage Through Buchner Filter
  1.1 Condition 200 ml sludge by the decanting method with the flocculant selected in the optimum dosage.
  1.2 Note the number of decantings made to achieve optimum flocculation.
  1.3 Filter with buchner filter equipped with a "pressure strip" filter.
  1.4 Note the duration of drainage T, the clarity of the filters Cf, and the volume of filtrate Vf.

(2) Dehydration Under Pressure
  2.1 Install the buchner filter containing the drained sludge on the lower part of the apparatus.
  2.2 Position a second filter above, then add the stationary plastic disk.
  2.3. Position the inflatable cushion connected to the upper part of the cell and connect the units firmly with the two screws on the lower part.
  2.4 Connect the foot pump to the cell and place it on a receiving vessel (of the 11 cup type).
  2.5 Apply pressure progressively in steps from 1 bar to 5 bar. Each pressure increase is made after drainage of the filtrate has stopped completely or after one minute under pressure.
  2.6 Remove the cushion and deposit the cake obtained on a dry surface.

(3) Dryness Measurement
  3.1 Calibrate an aluminum test crucible on an infrared scale.
  3.2 Using a specific gauge, cut off a part of the dehydrated cake in the center of the filter.
  3.3 Place the part of the cake cut off in the crucible.
  3.4 Place the infrared scale in auto position and apply a temperature of 140° C. until measurement is stabilized.
  3.5 Note the percentage of dry matter obtained by determining the dryness.

LABORATORY TESTS STRIP FILTER (A) Equipment:
  400-ml beakers
  Buchner filter 90 mm in diameter
  strip filter cloth 90 mm in diameter
  graduated 250-ml test tube
  chronometer.

(B) Procedure
  (1) Determination of amount of polymer:
    place 200 ml of sludge in a 400-ml beaker.
    add 5 ml of one of the polymers to be tested.
    mix the flocculant with the sludge by transferring from beaker to beaker until flocculation takes place.
    if good, flocculation is obtained, repeat the operation with 1 ml less.
    if flocculation is not achieved, repeat the operation with 1 ml more.
    the optimum amount to be added is the smallest amount required to achieve flocculation.
  (2) Evaluation of polymers:
    place 200 ml sludge in a 400-ml cup.
    add the amount of polymer determined in Section (1)
    mix the polymer by transfer from beaker to beaker.
    note the number of transfers necessary to achieve flocculation.

place the filter cloth in the buchner filter and wet the entire unit.

place the buchner on the graduated test tube.

pour the flocculated sludge into the buchner and start the chronometer.

note the volume drained after 5, 10, 15, and 30 seconds.

repeat the operation with each polymer to be tested.

(C) Interpretation the best product is the one which releases the maximum amount of water in the minimum amount of time.

The number of decantings gives an idea of the capacity of the polymer for mixing with sludge.

If the drainage area of the filter is very short (less than 1 meter), the volume drained in 10 seconds is to be taken into account.

Note

If the concentration of solution used industrially is lower than 3 g/l, it is important to operate at the same concentration.

If the results obtained do not permit differentiation of certain products, these tests should be repeated with two or three different amounts.

TABLE B

Type of paste: 70% KF, 10% KR, 20% PM, 20% GCC  
CSF: 354  
Consistency (before dilution): 1.5%  
RPM: 1,500/1,000  
pH: paste: 7.5  
G80

| Test | Category | A. Ret(ention) | % | Cplt | % | Mi(nimum) cha(rge) Ash (%) | | Ash (g) | | Ctn % | | Turb 30' | | Turb 30' |
|------|----------|----------------|-----|------|-----|-----|-----|--------|--------|--------|--------|--------|--------|------|
|      |          |                |     |      |     | X   | R2  | X      | R2     | X      | R2     | X      | R2     | CSF  |
| 14   | 2-2-7.1  | U5H27SO5       | 0.2 | —    | —   | 20  |     | 0.2955 | 0.3461 | 72.96% | 88.57% | 18     | 45     |      |
| 15   |          | PEI            | 0.2 | —    | —   | 20  |     | 0.2306 | 0.2895 | 59.13% | 76.97% | 83     | 124    |      |
| 28   | 2-2-7.1  | U5H27SO5       | 0.5 | —    | —   | 20  |     | 0.2954 | 0.3374 | 73.14% | 84.87% | 130    | 119    |      |
| 29   |          | PEI            | 0.5 | —    | —   | 20  |     | 0.2137 | 0.2886 | 62.70% | 74.88% | 95     | 117    |      |

| Test | Category | A. Ret(ention) t = 10 s | % | Cplt t = 60 s | % | Mi(nimum) cha(rge) Turb (%) | | | MES | | mg/l Weight | | Sheet | | % retent. | | % retent. |
|------|----------|------|-----|------|-----|-----|-----|-----|------|------|------|------|------|------|------|------|------|
|      |          |      |     |      |     | X   | R1  | R2  | X    | R2   | X    | R2   | X    | R2   | X    | R2   |      |
| 14   | 2-2-7.1  | U5H27SO5 | 0.2 | — | — | 20 | 540 | 486 | 437 | 214.1 | 215 | 2.3206 | 2.3 | 95.09% | 95.03% |
| 15   |          | PEI     | 0.2 | — | — | 20 | 937 | 1916 | 2345 | 278.1 | 385.4 | 2.1806 | 2.1702 | 93.33% | 90.95% |
| 28   | 2-2-7.1  | U5H27SO5 | 0.5 | — | — | 20 | 666 | 670 | 963 | 232.4 | 270.5 | 2.3149 | 2.3252 | 94.68% | 93.88% |
| 29   |          | PEI     | 0.5 | — | — | 20 | 695 | 918 | 1430 | 244.3 | 339.7 | 1.9178 | 2.2157 | 93.34% | 92.09% |

TABLE C

Date: Oct. 3, 1996  
Type of paste: 70% KF, 10% KR, 20% PM, 20% GCC  
CSF: 354  
Consistency (before dilution): 1.5%  
Test No 1 at different hydrolysis rates.  
RPM: 1,500/1,000  
pH: paste: 7.5  
G80

| Protocol | A. Ret(ention) t = 10 s | % | Cplt t = 60 s | % | Mi(nimum) cha(rge) Turb (%) | | | MES | | mg/l Weight | | Sheet | | % retent. | | % retent. |
|----------|------|-----|------|-----|-----|-----|-----|------|------|------|------|------|------|------|------|
|          |      |     |      |     | X   | R1  | R2  | X    | R2   | X    | R2   | X    | R2   | X    | R2   |
| 1 | — | — | — | — | 20 | >4000 | 3580 | 3360 | 786.9 | 1470.48 | 2.0867 | 2.0554 | 82.56% | 71.40% |
| 2 | 4% hydrol. | 0.5 | — | — | 20 | 2321 | 1552 | 1180 | 326.1 | 298.1 | 2.324 | 2.242 | 92.71% | 93.07% |
| 3 | 8% | 0.5 | — | — | 20 | 1998 | 704 | 512 | 289 | 210.7 | 2.3686 | 2.5576 | 93.60% | 95.59% |
| 4 | 15% | 0.5 | — | — | 20 | 1508 | 804 | 509 | 262.7 | 234.6 | 2.3414 | 2.3324 | 94.09% | 94.67% |
| 5 | 25% | 0.5 | — | — | 20 | 630 | 331 | 195 | 185.7 | 157.2 | 2.525 | 2.6095 | 96.04% | 96.74% |
| 6 | 32% | 0.5 | — | — | 20 | 550 | 261 | 188 | 189.8 | 124.1 | 2.3006 | 2.4431 | 95.58% | 97.23% |
| 7 | PEI | 0.5 | — | — | 20 | 560 | 963 | 1574 | 200.9 | 352.2 | 2.1546 | 2.2048 | 95.04% | 91.79% |

| Test | % | A. Ret(ention) | % | Cplt | % | Mi(nimum) cha(rge) Ash (%) | | Ash (g) | | Ctn % | | Turb 30' | | Turb 30' |
|------|-----|----------------|-----|------|-----|-----|-----|--------|--------|--------|--------|------|------|------|
|      |     |                |     |      |     | X   | R2  | X      | R2     | X      | R2     | X    | R2   | CSF  |
| 1 | — | — | — | — | 20 | 0.0411 | 0.0844 | 10.05% | 21.41% | 3558 | 3845 |
| 2 |   | U5H4SO5  | 0.5 | — | — | 20 | 0.254  | 0.341  | 61.35% | 89.69% | 34 | 35 |
| 3 |   | U5H8SO5  | 0.5 | — | — | 20 | 0.2613 | 0.3802 | 62.00% | 87.31% | 22 | 17 |
| 4 |   | U5H15SO5 | 0.5 | — | — | 20 | 0.2649 | 0.3634 | 63.79% | 92.28% | 30 | 16 |
| 5 |   | U5H25SO5 | 0.5 | — | — | 20 | 0.3218 | 0.4008 | 73.03% | 90.73% | 22 | 16 |
| 6 |   | U5H32SO5 | 0.5 | — | — | 20 | 0.3211 | 0.3981 | 80.93% | 97.33% | 24 | 15 |
| 7 |   | PEI      | 0.5 | — | — | 20 | 0.2431 | 0.2989 | 63.44% | 78.41% | 21 | 39 |

TABLE A

V-501   4,4'-Azobis(4-cyano-pentanoic acid)

$$HOOC-CH_2-CH_2-\underset{CN}{\overset{CH_3}{C}}-N=N-\underset{CN}{\overset{CH_3}{C}}-CH_2-CH_2-COOH$$

TABLE A-continued

| | | |
|---|---|---|
| V-70 | 2,2'-Azobis(4-methoxy-2,4-dimethylvaleronitrile) | $CH_3-\underset{\underset{CH_3}{\mid}}{\overset{\overset{OCH_3}{\mid}}{C}}-CH_2-\underset{\underset{CN}{\mid}}{\overset{\overset{CH_3}{\mid}}{C}}-N=N-\underset{\underset{CN}{\mid}}{\overset{\overset{CH_3}{\mid}}{C}}-CH_2-\underset{\underset{CH_3}{\mid}}{\overset{\overset{OCH_3}{\mid}}{C}}-CH_3$ |
| VA-044 | 2,2'-Azobis(N,N'-dimethyleneisobutyramidine)dihydrochloride | (imidazoline ring)$-\underset{\underset{CH_3}{\mid}}{\overset{\overset{CH_3}{\mid}}{C}}-N=N-\underset{\underset{CH_3}{\mid}}{\overset{\overset{CH_3}{\mid}}{C}}-$(imidazoline ring) · 2HCl |
| V-50 | 2,2'-Azobis(2-amidino-propane)dinydrochloride | $\underset{NH_2}{\overset{NH}{\diagdown}}C-\underset{\underset{CH_3}{\mid}}{\overset{\overset{CH_3}{\mid}}{C}}-N=N-\underset{\underset{CH_3}{\mid}}{\overset{\overset{CH_3}{\mid}}{C}}-C\underset{NH_2}{\overset{N}{\diagup}}$ · 2HCl |
| V-60 | 2,2'-Azobisisobutyro-nitrile | $CH_3-\underset{\underset{CN}{\mid}}{\overset{\overset{CH_3}{\mid}}{C}}-N=N-\underset{\underset{CN}{\mid}}{\overset{\overset{CH_3}{\mid}}{C}}-CH_3$ |

What is claimed is:

1. A process of synthesis of polymers (or copolymers) of the PVA (polyvinylamine) type, powdered or in emulsion, characterized in that polymerization is initiated below 25° C. and under atmospheric pressure, starting with the N-vinylformamide monomer;
 wherein the process is initiated by a combination of redox and azoic catalysts.

2. A process of synthesis of polymers of the PVA (polyvinylamine) type, powdered, as specified in claim 1, wherein the polymerization is polymerization in mass, in an aqueous medium or in water, and starts at a temperature from −2° C. to 10° C. the process is initiated by an original combination of redox and azoic catalysts, then proceeds at a temperature below 100° C. and is conducted under atmospheric pressure.

3. A process of synthesis of polymers of the PVA (polyvinylamine) type, powdered, as specified in claim 1, wherein the polymerization is conducted in water and results in a gel of non-ionic PVA.

4. A process of synthesis of polymers of the PVA (polyvinylamine) type, powdered, as specified in claim 1, wherein the polymerization is followed by direct hydrolysis of the gel obtained at the end of polymerization in order to obtain a cationic PVA polymer which undergoes a standard drying stage, optionally in a fluidized bed or in a rotary oven.

5. A process of synthesis of polymers of the PVA (polyvinylamine) type, powdered, as specified in claim 1, characterized in that such process consists of
 (a) polymerization of the vinylformamide monomer in an aqueous medium, in mass, at a polymerization initiation temperature near 0° C. and at a temperature at the end of polymerization which remains lower than or equal to 100° C. under atmospheric pressure, in the presence of a polymerization initiator comprising at least one combination of redox system and initiator of the azoic type,
 (b) thereby obtaining a non-ionic PVA polymer gel, which is optionally not isolated,
 (c) grinding the gel thereby obtained by a mechanical means, an endless screw or, a household chopper of the Moulinex™ type,
 (d) hydrolyzing the gel obtained.

6. A process of synthesis of polymers of the PVA (polyvinylamine) type, powdered, as specified in claim 1, wherein the polymerization initiation temperature is from −2° C. to 10° C.

7. A process of synthesis of polymers of the PVA (polyvinylamine) type, powdered, as specified in claim 1, wherein the polymerization is conducted without a solvent.

8. A process of synthesis of polymers of the PVA (polyvinylamine) type, powdered, as specified in claim 1, wherein the hydrolysis is conducted with the gel ground, in a continuous or semi-continuous process.

9. A process of synthesis of polymers of the PVA (polyvinylamine) type, powdered, as specified in claim 1, wherein the hydrolysis is carried out with the gel, which contains 30 to 60% water.

10. A process of synthesis of polymers of the PVA (polyvinylamine) type, powdered, as specified in claim 1, wherein the hydrolysis is conducted in an acid or basic OH(−) or H(+) environment, the soda NaOH or phosphoric acid H3PO4 being used as the agent of hydrolysis.

11. A process of synthesis of polymers of the PVA (polyvinylamine) type, powdered, as specified in claim 1, wherein the hydrolysis is conducted with the gel at the end of polymerization, without an additional specific heating step for carrying out the hydrolysis.

12. A process of synthesis of polymers of the PVA (polyvinylamine) type, powdered, as specified in claim 1, wherein the rate of hydrolysis ranges from 20% to 70% amine functions.

13. A process of synthesis of polymers of the PVA (polyvinylamine) type, in emulsion, as specified in claim 1, wherein the polymerization is conducted in emulsion, while the process is started below 25° C.

14. A process of synthesis of polymers of the PVA (polyvinylamine) type, in emulsion or as "dry powder," as specified in claim 1, wherein such process consists of:
 (i) preparation of an aqueous phase comprising the monomer N-vinylformamide (NVFA), water, and appropriate additives and comprising at least one azoic initiator and also at least one oxidant, (ii) preparation of an organic phase comprising a light and/or a heavy oil and a mixture of surfactants;

(iii) preparation of a reverse emulsion in a known manner by means of two phases, which are caused to be degassed;

(a) initiation of emulsion polymerization at a near the ambient and at a polymerization temperature which remains lower than 60° C. by absorbing the exothermal release with water, under atmospheric pressure, in the presence of a polymerization initiator comprising at least one combination of redox system and initiator of the azoic type, (b) thereby obtaining a non-ionic PVA polymer emulsion which is optionally not isolated, (c) hydrolysis of the emulsion thereby obtained, (d) optionally drying of the emulsion by pulverization or agglomeration drying to form a "dry powder."

15. A process of synthesis of polymers of the PVA (polyvinylamine) type, in an emulsion or "dry powder" as specified in claim 1, wherein the initiation temperature of polymerization is an ambient temperature and wherein a reducing agent of the redox couple is added continuously.

16. A process of synthesis of polymers of the PVA (polyvinylamine) type in an emulsion or "dry powder," as specified in claim 15, wherein use is made of surfactants, and mixtures of surfactants, and the HLB of the mixture is set at a value ranging from approximately 4 to 5.

17. A process of synthesis of polymers of the PVA (polyvinylamine) type in an emulsion or "dry powder," as specified in claim 15, wherein reaction pressure is allowed to be established.

18. A process of synthesis of polymers of the PVA (polyvinylamine) type in an emulsion or "dry powder," as specified in claim 14, wherein hydrolysis of the emulsion obtained in polymerization is conducted.

19. A process of synthesis of polymers of the PVA (polyvinylamine) type in an emulsion or "dry powder," as specified in claim 18, wherein the hydrolysis is carried out in an OH(−) or H(+) medium such as 75% phosphoric acid.

20. A process of synthesis of polymers of the PVA (polyvinylamine) type in an emulsion or "dry powder," as specified in claim 18, wherein use is made for hydrolysis of the heat of reaction, this eliminating the need for heating the hydrolysis medium, the temperature at the end of polymerization being sufficient for the hydrolysis or slight overheating may optionally be carried out to accelerate the pace of hydrolysis.

21. A process of synthesis of polymers of the PVA (polyvinylamine) type in an emulsion or "dry powder," as specified in claim 14, wherein the degree of hydrolysis ranges from 20 to 70% of amine functions.

22. A process of synthesis of polymers of the PVA (polyvinylamine) type in an emulsion or "dry powder," as specified in claim 14, wherein the hydrolyzed emulsion gains from 1 to 5% by weight during agitation of the reversing agent NP9, which serves to render the emulsion soluble in water.

23. A process of synthesis of polymers of the PVA (polyvinylamine) type in an emulsion or "dry powder," as specified in claim 1, wherein such process generally comprises initiation of polymerization of N-vinylformamide at a temperature from −2 to 10° C. for the powder option, or 15–25° C. for the emulsion option, by means of an initiating combination of redox system and azoic catalyst(s).

24. A process of synthesis of polymers of the PVA (polyvinylamine) type in an emulsion or "dry powder," as specified in claim 1, wherein redox system used for polymerization consists of a combination of tertiobutyl hydroperoxide, or TBHP, and sodium metabisulfite.

25. A process of synthesis of polymers of the PVA (polyvinylamine) type in an emulsion or "dry powder," as specified in claim 1, wherein other redox systems which may optionally be used include:

oxidants, hydroperoxides, cumene hydroperoxide, oxygenated water, or persulfates, reduction agents, NaFS or formaldehyde-sodium sulfoxylate, salts of sulfites and bisulfites, or $SO_2$.

26. A process of synthesis of polymers of the PVA (polyvinylamine) type in an emulsion or "dry powder," as specified in claim 1, wherein an azoic initiator used is AZDN (azobisisobutyronitrile).

27. A process of synthesis of polymers of the PVA (polyvinylamine) type in an emulsion or "dry powder," as specified in claim 1, wherein the products identified below are used as azoic catalysts.

28. A process of synthesis of polymers of the PVA (polyvinylamine) type in an emulsion or "dry powder," as specified in claim 14, wherein the following initiator system is to be used:

a combination of tertiobutyl hydroperoxide or TBHP and sodium metabisulfite in a ratio of 1:0.5 to 1:3.

29. A process of synthesis of PVA copolymers as specified in claim 1, wherein N-vinylformamide is copolymerized with acrylamide (meth)acrylic acid, (meth)acrylates, monomers known by the abbreviations APTAC, MAPTAC, AMPS, N-vinylacetate, acrylonitrile, DADMAC, or optionally substituted, acrylamide.

30. A polyvinylamine, PVA, polymer, wherein such polymer is obtained as a gel or as an emulsion or as a "dry powder" by a process as specified in claim 1.

31. A polyvinylamine, PVA, polymer, wherein such polymer is obtained as gel or as an emulsion by a process as specified in claim 1 and is hydrolyzed or partially hydrolyzed by hydrolysis of such gel or emulsion obtained by such process, respectively as grains or powder or "dry powder," or as a reverse emulsion reversible in water.

32. An emulsion, reversed in water, of a hydrolyzed or partially hydrolyzed povinylamine, PVA, wherein such emulsion has been obtained by the process specified in claim 1.

33. A gel or "dry powder" of hydrolyzed or partially hydrolyzed polymer polyvinylamine, PVA, wherein such gel or "dry powder" has been obtained by the process specified in claim 1.

34. An emulsion reversed in water of polymer polyvinylamine, PVA, hydrolyzed or partially hydrolyzed as specified in claim 32, wherein such emulsion is combined with one or more solutions or emulsions of flocculant/coagulant agents of high molecular weight.

35. A hydrolyzed or partially hydrolyzed polymer polyvinylamine, PVA, obtained as a powder or "dry powder" by the process specified in claim 1 and introduced in the form of a solution into water or into an aqueous solution.

36. Powdered polymers as specified in claim 30 in sol, in an aqueous medium such as water.

37. PVAs as specified in claim 30, as powder or as emulsion alone, or in combination with other powders and/or other solutions of flocculants and/or coagulants.

38. An intermediate gel or emulsion obtained at the end of polymerization as specified in claim 1, before hydrolysis.

39. Compositions characterized in that said compositions include at least one PVA obtained in a powdered or emulsion form as specified in claim 1.

40. Compositions for paper use, characterized in that said compositions comprise at least one PVA obtained in a powdered or emulsion form as specified in claim 1.

41. Compositions for waste water treatment, characterized in that said compositions comprise at least one PVA obtained in a powdered or emulsion form as specified in claim 1.

42. Compositions for petroleum and parapetroleum applications, characterized in that said compositions comprise at least one PVA obtained in a powdered or emulsion form as specified in claim 1.

43. Compositions as specified in claim 39, characterized in that such compositions are combined or associated with at least one other flocculent and/or coagulant agent of high molecular weight, and optionally of other known additives.

44. A formulation for PVA powder produced as specified in claim 1, characterized in that such formulation comprises a charge of 1500 g or:

monomer N-vinylformamide NVFA (VINAMER™)= 660 g pure $H_2O$: 840 g sodium acetate (salt): 0.1% (relative to charge): 1.5 g $H_2PO_4$ 40%: amount needed to obtain pH of 6.00

(b) Catalysis:

| 100 | 100 | 75 | ppm VA 044/charge |
|---|---|---|---|
| 0 | 0 | 0 | ppm V 50/charge |
| 1000 | 1000 | 700 | ppm AZDN/charge |
| 200 | 150 | 100 | ppm TBHP/charge |
| 250 | 150 | 75 | ppm MBS/charge |
| 1:25 | 1:40 | 2:00 | kinetics |

(c) initial temperature: 0° C. final temperature: 100–102° C. pH=5–6 UL viscosities of final product:

| TEST No. 1 | TEST No. 2 | TEST No. 3 |
|---|---|---|
| 2.2 cPs | 1.6 cPs | 3.1 cPs |

(Viscosity measurement with 1 g active polymer per liter in 1-mol NaCl solution, at 25° C., 60 rpm, UL adapter).

45. A process of polymerization of N-vinylformamide in emulsion as specified in claim 6, characterized in that such process comprises the following stages:

Phase ratio 71/29.

(a) aqueous phase

| 250 | | | G NVFA (BASF) |
|---|---|---|---|
| 50 | 25 | 25 | ppm TBHP/aqueous phase |
| 166 | 100 | 75 | ppm VA 044/total charge |
| 0 | 0 | 25 | ppm V 50/total charge |
| 460 | 460 | 460 | g water |
| 0.01 | 0.01 | 0.01 | % sodium acetate/total | pH = 6

(b) organic phase:

260 g Exxsol D100

2% HLB Span 80: 4.3

1% HLB Hypermer 1083: 5.5

(c) the total amount of azoic initiator(s) indicated and the amount of TBHP indicated are introduced in the aqueous phase;

(c') the two phases are emulsified;

(d) the emulsion is degassed for 30 minutes, starting at an ambient temperature of the order of 15 to 20° C. At the end of degassing the metabisulfite component of the redox couple is introduced continuously for this purpose, in a solution diluted to 1 g/l;

(e) once emulsion has been started, release of heat is controlled by absorption of heat in water;

(f) the final temperature is near 54° C. and the reaction time is 3 hours to 4:30;

(g) the final product is then incorporated into a reversing agent of the NP9 type at the rate of 2.2%

UL viscosities:

| 3.6 cPs | 3.9 cPs | 4.1 cPs |
|---|---|---|

(viscosity measurement with 1 g active polymer per liter in a 1-mol NaCl solution, 25° C. 60 rpm, UL adaptor);

starting with step (f), amounts of 75-% phosphoric acid ranging from 0.023 mol to 0.092 mol are added to the emulsion (100 g).

46. Paper products, characterized in that such products contain or have been treated with a PVA agent or a PVA composition produced as specified in claim 1.

47. Petroleum or parapetroleum products and fluids, characterized in that such products and fluids contain or have been treated with a PVA agent or a PVA composition produced as specified in claim 1.

48. Waste water and industrial effluents, characterized in that such water and effluents contain or have been treated with a PVA agent or PVA composition produced as specified in claim 1.

* * * * *